Patented Dec. 16, 1947

2,432,971

UNITED STATES PATENT OFFICE 2,432,971

POROUS COMPOSITION OF MATTER AND METHOD OF MANUFACTURE

Kenneth S. Ruthman and Joseph R. Parsons, Chicago, Ill., assignors to United States Gypsum Company, Chicago, Ill., a corporation of Illinois No Drawing. Application March 31, 1945, Serial No. 586,044

4 Claims. (Cl. 106—86)

This invention relates to materials containing water migratable substances and particularly relates to composition in which a substantial movement of water dispersible materials during drying gives deleterious results. This invention also relates to the production of extremely lightweight materials.

In the manufacture of products in which a water dispersible material is used there has frequently been encountered a movement of such materials towards the outer surfaces during drying, particularly when the drying operation is accelerated by the use of high temperatures and forced circulation of air, the usual commercial practice. A few of the many products in which this difficulty of migration of water-borne materials during drying is experienced are those formed from gypsum and other molded products cast from porous or foamed compositions. For example; when water soluble binders such as dextrine are added to calcined gypsum and formed into a cast with water and then dried, the dextrine will have been found to collect near the surface of the dried cast. While in some cases this may be wanted yet in many other cementitious products such a migration is highly undesirable. In the manufacture of lightweight acoustical material, such as those made using fiber, it is customary to use water dispersible binders such as starch, emulsified drying oils and water soluble fire retarding materials like boric acid. Great difficulty is encountered with "bleeding" or migration of these materials to the surface. This means that additional material must be used to compensate for this loss with a consequent increase in density and cost and also in many cases, an unsightly appearance results.

By following this invention, as will be subsequently clearly disclosed, it is possible to limit this migration very materially, or prevent it completely thereby giving a substantial improvement in the properties of the product so formed. Another advantage of this invention is that a very lightweight insulating product, hitherto unobtainable, can be made. It is the purpose therefore of this invention to disclose products which are extremely low in density and/or in which water soluble materials contained therein have very little or no tendency to migrate towards the surface during the drying operation and also means by which this can be carried out. These novel properties, which have hitherto not been obtained, are achieved by the use of a material which will prevent the collapse of the extremely lightweight products and/or which will lock the water soluble or dispersible substances in place during drying.

This invention takes advantage of the fact that certain materials thicken very greatly in aqueous solution in very low concentration when heated, to form a gel-like mass. This gel-like mass until destroyed by the drying operation maintains the strength of the lightweight product and/or stops migration of the water soluble materials. It has been discovered that the most satisfactory material to form a gel-like mass when heated is a solution of methyl cellulose; hence, throughout all the forthcoming examples given to illustrate means by which this invention can be carried out, methyl cellulose will be used as the active material. The examples are merely illustrative of means by which this invention can be carried out and are not intended to be a limitation of its scope for various equivalent materials maybe used and still be within the ambit of the invention.

EXAMPLE 1

*Prevention of migration in a cast cementitious material*

| | Parts |
|---|---|
| 1% solution in water of methyl cellulose | 100 |
| .1% fluorescin dye solution | 1 |
| Calcined gypsum as hemihydrate | 100 |

The ingredients are mixed and cast into any shape desired. After the calcined gypsum has set the cast is dried at 140° F. It will be found that the dye is uniformly distributed throughout the object which has been cast and dried. Ordinarily the dye would have migrated to the surface. Various other water soluble materials can be used as well as other cementitious materials and substantially the same freedom from migration will be experienced.

EXAMPLE 2

*Prevention of migration in lightweight products made using foam and cellulose fiber*

| | Parts |
|---|---|
| .75% solution in water of methyl cellulose | 1000 |
| Soap bark | 30 |
| Cellulose fiber such as dry ground paper | 200 |
| Boric acid | 30 |

The methyl cellulose solution, soap bark and boric acid are added to a suitable mixer and foamed. The dry fiber is dispersed into the foam by further mixing. A mat is made and the mat compressed while wet to the desired density. It is then dried at 250° F. The fire retardant boric acid will be found substantially uniformly distributed throughout the lightweight mass instead of concentrated at the surface as would normally be experienced. Other water soluble materials in a similar manner will also be trapped and prevented from migrating.

EXAMPLE 3

*Prevention of collapse in a foamed cementitious material prior to set*

|  | Parts |
|---|---|
| .75% solution in water of methyl cellulose | 1 |
| Calcined gypsum, hemihydrate | 1 |
| Foaming agent | .02 |

The foaming agent can be the sodium salt of a half sulfuric acid ester of a fatty alcohol ester of "substance A" containing 90% sodium alkyl sulfate in which the alkyl group has 10 to 14 carbon atoms, mostly 12, or the sodium salt of a sulfonated hydrocarbon such as "substance B" containing 35% sodium alkyl sulfonate in which the alkyl group contains 11 to 15 carbon atoms. The foaming agent is placed in the methyl cellulose solution and then foamed such as by beating with a revolving wire whip. The dry calcined gypsum is then added to the foam and the porous mass formed into the shape desired. The temperature is then elevated to about 136° F. or above but below the temperature which will prevent the setting of the calcined gypsum until the cast has set. Final drying of the cast can then be made. No appreciable change in dimensions will be experienced before the plaster has set. The object so formed can then be dried.

EXAMPLE 4

*Prevention of migration and structural collapse in a low density fibrous material*

A foam solution is made as follows:

|  | Parts |
|---|---|
| 1% solution in water methyl cellulose | 350 |
| Vinyl chloride resin emulsion (50% solids) | 40 |
| Ground dry sulfite fiber | 40 |
| Foaming agent such as substance A | 4 |

The various ingredients, except the fiber, are mixed together and foamed in a suitable mixer, such as a revolving whip type. Then the dry sulfite fiber is suspended on the foam. The mixture is formed into the shape desired such as an insulation blanket and then dried at a temperature of about 250° F. If properly made and dried the final density of the material may be as low as 0.2 lb. per cu. ft. with no appreciable collapse or migration; when dry, the product so formed exhibits the properties of sulphite fiber bonded with vinyl resin. The resin obscures the methyl cellulose. This extremely lightweight material has hithertofor not been obtainable and in spite of its extraordinary low density is still comparatively strong and will not disintegrate in water. It is more resilient and tougher than even denser products and surprisingly resistant to failure under great deformation.

EXAMPLE 5

*Prevention of structural collapse in a foam all of whose constituents are initially soluble*

|  | Parts |
|---|---|
| 3% solution in water of methyl cellulose | 400 |
| Melamine formaldehyde resin do | 100 |
| Foaming agent such as substance A do | 4 |
| Sulfuric acid solution to a pH parts between 4 and 5 | |

The melamine-formaldehyde resin can be any of the water soluble type which can be hardened by an acid catalyst without heat. The various materials are mixed together and the solution so formed is foamed in a suitable mixer, molded, and dried at elevated temperatures. The drying is somewhat critical and care must be used to have the proper air temperature and velocity. A temperature of 350° F. and a velocity of 1500 ft. per min. for the drying gases have been found satisfactory for the above. These should be adjusted to the density. A lower density will require a faster drying condition. The dried product is an insoluble, low density, cellular mass. A density as low as 0.5 lb. per cu. ft. can be obtained.

EXAMPLE 6

*Prevention of densification of aqueous suspension of asbestos fibers during drying*

|  | Parts |
|---|---|
| 1% methyl cellulose solution | 500 |
| 5K asbestos fibers | 20 |

The above are mixed together and dried at 250° F. The tendency of the asbestos fiber to form a dense mass is overcome and a comparatively light fibrous product is obtained.

In all of the above examples all percentages and parts are by weight. In these examples it is proposed to use 4000 cps. (centipoises) methyl cellulose, i. e., one in which the viscosity of a 2% aqueous solution is approximately 4000 centipoises at 20° C. Though this material has given very good results, it is not the intention to limit this application to such a particular grade of methyl cellulose for others of greater or lesser viscosity may be used with varying results. If the viscosity is lower, then the concentration must be increased in order to obtain a gel when heated. If the methyl cellulose is of the lower viscosity type then the concentration must be increased in order to obtain a gel when heated. The important thing is that a gel must form during drying at the elevated temperature and that the minimum quantity of methyl cellulose should be used in order to minimize its tendency to cause the product containing it to disintegrate when placed in water. Also, the amount used should be reduced to as small a quantity as possible; in some cases it tends to inhibit the film forming properties of the binders used such as in the case of rubber latex and vinyl chloride resin latices. When only a small quantity is needed the binder ordinarily used seems to obscure the deleterious property of methyl cellulose of contributing to disintegration of the product in water.

The gelation temperature of aqueous methyl cellulose solutions depends upon the concentration and upon the viscosity of the type used and upon the presence of soluble salts. Ordinarily, the greater the concentration of methyl cellulose and the higher its natural viscosity the lower the temperature of gelation. Without interferences from soluble salts the gelation temperature of a .5% solution of 1500 or 4000 centipoises and methyl cellulose, the gelation temperature is between 136 to 140° F. If 100 (centipoises) methyl cellulose is used about 1.0% concentration will be needed to give gelation. In this case the gelation temperature will be between 147 to 151° F. If the concentration of the solution or the viscosity of the methyl cellulose are too low no gel will form; only a precipitate will take place. Soluble salts tend to lower the gelation temperature. It is the negative ion of the salt and its concentration which appears to affect the gelation such as phosphates, sulfates, tartrates, acetates, chlorides, etc.

The methyl cellulose solution is preferably prepared by taking one half or less of the final desired amount of water, at a temperature of not less than about 150° F. preferably boiling and disperse therein the methyl cellulose fiber which will remain undissolved. After about 20 to 30 minutes the remaining water is added as conveniently cold as possible, or as ice, and as the temperature becomes below about 90° F. the methyl cellulose will slowly go into uniform solution. Other means of effecting a solution of the methyl cellulose in water can be used if desired. In order to be sure that a gel will form when heated it is desirable to have at least about .75% of the weight of the water that is actually present during drying as methyl cellulose. Thus water of crystallization or water of hydration of fiber can be deducted in figuring the amount of methyl cellulose needed. This percentage is based upon a methyl cellulose having 4000 centipoises viscosity. The percentage of methyl cellulose needed to form a gel varies with the viscosity. The lesser the viscosity the higher the percentage needed. In all events, it is important that a gel be formed when the material is heated. If a substantially lower percentage is used a precipitate and not a gel will form. In certain composition a gel may form with as low as .5% concentration but in order to be safe a .75% solution of 4000 centipoises methyl cellulose, based on the water present during drying, is needed. One of the remarkable phases of this discovery, and one which contributes to its commercial utility is the fact that only a small percentage of the methyl cellulose is needed to be effective. It is important in all cases that the gel be formed in situ which is interpreted to mean the formation of a gel of the methyl cellulose which is in solution with the remaining free water within the product itself during the drying operation or when heated before drying.

While methyl cellulose, such as one having a viscosity rating of 4000 centipoises, is the material of choice; any similar water dispersable material which will gel or greatly thicken when heated at similar concentration will be satisfactory and can be considered an equivalent. The gelling must not be due to a mere drying out of the material but to an actual thickening which should take place without any decrease in the amount of water present. The phenomenon of an aqueous methyl cellulose solution of gelling or thickening when heated takes place at around 136° F. as mentioned above so that it is necessary to heat to at least this temperature in order to obtain the results disclosed in this invention though of course much higher temperatures can be used and are preferred. The highest temperature feasible with the materials to be dried will usually be found most desirable. The methyl cellulose is not intended to be used as a binder but for the purpose of preventing collapse or migration during drying.

Besides the examples given there are obviously many other uses in which this invention may be carried out after a careful reading of the disclosure set forth and without the exercise of no more than the ordinary skill of the art in which this invention is a part.

While in the above examples, soap bark, substance A and substance B are given as types of foaming agents which can be used, it is not intended to limit this invention to such materials specifically but to any foaming agent except of course those which will render the methyl cellulose ineffective. Examples of other suitable foaming agents are all saponin containing materials such as, soap weed, yucca root, pure saponin, etc., but it has been found that an uneconomic concentration is required when used with methyl cellulose. This is also true of degraded proteins which are commonly used as foaming agents. Besides the materials given as examples of foam producing materials following Example 3, other materials which can be used with methyl cellulose to produce foam are octadecyl trimethyl ammonium chloride and dodecyl amine acetate.

Examples of foaming materials which do not work are the sodium and potassium salts of fatty acids. These foam satisfactorily but inhibit the gelation of the methyl cellulose thereby materially reducing its effectiveness. On the other hand, ammonium soap, of the fatty acids are satisfactory presumably because during drying the ammonia is volatilized.

While it is preferred to foam separately it can be generated in situ such, for example, as by the reaction of sodium carbonate and sodium acid sulfate along with a suitable gas entrainer such as described above.

Various types of fibrous and cementitious materials as well as various types of binders can be used. Examples of fibers are asbestos, synthetic, organic and mineral fibers, wood fiber, wood pulp, wood flour, cotton fibers, fibers from grasses and other plants not classified as wood. Tabular materials such as ground mica can also be advantageously bonded together following the principle of this invention. The cementitious materials used are those which set with water such as alpha gypsum a special type of calcined gypsum hemihydrate, see Patent Number 1,901,051, or any calcined gypsum as well as those classified as Portland cement or the like. The binders can be of the drying oil type, alkyd resins, urea formaldehyde and melamine formaldehyde resin, natural gums, rosin or its derivatives, asphalt, or other bitumins, natural and artificial rubber, latices and other synthetic resins all either in aqueous solution or as an emulsion. Any materials however, which will form a precipitate or are incompatible with methyl cellulose will not always be found suitable and may give difficulty as well as any which contains foam breaking materials when used with foam. Phenolic resins are incompatible except in the presence of a high amount of ammonia. Other foaming agents than those described will be suitable as well as other water soluble dyes and fire retarding material except sodium silicate. These equivalent materials may require a variation in the formulas given which, however, will not be beyond the mere mechanical ability of those skilled in the art in which this is a part.

By way of summary this invention comprises the use of a water soluble or dispersible material, preferably a methyl cellulose of high viscosity, which will thicken, when heated, to substantially a gel-like material, thereby stabilizing a porous lightweight mass so that it will not collapse during drying, hence enabling a much lighter weight insulating material to be made with or without fiber; or which will substantially completely stop the migration of water dispersible materials during the drying operation thereby preventing bleeding to the surface. It is also a part of this invention to use a small quantity of methyl cellulose so that the other binders used are sufficient to overcome the disadvantage of methyl cellulose in contributing to the disintegration of the product when wet.

Although there has been disclosed a practical embodiment of this invention and specific examples, theories, and uses, which are given to insure a clear understanding of the essence of this invention, it is not the intention to be limited thereby for obviously many variations may be made by those skilled in the art and still be within the scope of this invention which is only limited in extent by the forthcoming claims.

We claim:

1. A porous, fibrous, cementitious composition of low density comprising a set cementitious material selected from the group consisting of calcium sulfate and Portland cement, a fibrous material, and a dry methyl cellulose foam gel, said methyl cellulose present in a lesser concentration than the cementitious material.

2. The method of preparing a dried, porous composition of matter which method comprises forming a foamed, aqueous solution containing dissolved therein at least 0.5% of a water soluble methyl cellulose and a foaming agent, said solution being heat gelable at a temperature of at least about 136° F., and hardening the foam solution by drying at between about 136° F. and about 250° F., whereby collapse of the cellular structure is avoided.

3. The method according to claim 2 in which said solution contains ligno-cellulosic fibers dispersed therein.

4. The method of preparing a dried, porous composition of matter which method comprises forming a foamed, aqueous solution containing dissolved therein at least 0.5% of a water soluble methyl cellulose and a foaming agent, said solution being heat gelable at a temperature of at least about 136° F., dispersing into said solution a fibrous material and a cementitious material selected from the group consisting of calcined calcium sulfate and Portland cement, and hardening the foamed solution by drying at between about 136° F. and below a temperature which will destroy the set of said cementitious material, said solution formed into a predetermined shape prior to the final hardening.

KENNETH S. RUTHMAN.
JOSEPH R. PARSONS.

REFERENCES CITED

The following references are of record in the file of this patent:

UNITED STATES PATENTS

| Number | Name | Date |
| --- | --- | --- |
| 1,211,028 | Zappi | Jan. 2, 1917 |
| 1,901,057 | Roos | Mar. 14, 1933 |
| 2,023,800 | Williamson | Dec. 10, 1935 |
| 2,242,372 | Schneider | May 20, 1941 |
| 2,350,161 | Gloor | May 30, 1944 |
| 2,357,068 | Barab | Aug. 29, 1944 |
| 2,371,688 | Gold | Mar. 20, 1945 |
| 2,378,322 | Peterson | June 12, 1945 |
| 2,389,761 | Burgeni | Nov. 27, 1945 |